United States Patent [19]

Ohmori

[11] Patent Number: 5,298,353
[45] Date of Patent: Mar. 29, 1994

[54] ELECTROPHOTOGRAPHIC PHOTOSENSITIVE MEMBER

[75] Inventor: Hiroyuki Ohmori, Tokyo, Japan

[73] Assignee: Canon Kabushiki Kaisha, Tokyo, Japan

[21] Appl. No.: 29,995

[22] Filed: Mar. 11, 1993

Related U.S. Application Data

[63] Continuation of Ser. No. 625,803, Dec. 11, 1990, abandoned.

[30] Foreign Application Priority Data

Dec. 13, 1989 [JP] Japan .................................. 1-321281

[51] Int. Cl.$^5$ .............................................. G03G 5/06
[52] U.S. Cl. ........................................ 430/78; 430/58; 355/211
[58] Field of Search ................ 430/78, 58, 76, 59; 255/211

[56] References Cited

U.S. PATENT DOCUMENTS

| | | | |
|---|---|---|---|
| 4,444,861 | 4/1984 | Nogami et al. | 430/58 |
| 4,664,997 | 5/1987 | Suzuki et al. | 430/58 |
| 4,728,592 | 3/1988 | Ohaku et al. | 430/59 |
| 4,971,877 | 11/1990 | Miyamoto et al. | 430/76 |
| 5,227,271 | 7/1993 | Kikuchi et al. | 430/59 |

FOREIGN PATENT DOCUMENTS

| | | |
|---|---|---|
| 59-166959 | 9/1984 | Japan . |
| 63-000366 | 1/1988 | Japan . |
| 63-116158 | 5/1988 | Japan . |
| 63-198067 | 8/1988 | Japan . |
| 64-017066 | 1/1989 | Japan . |

Primary Examiner—Marion E. McCamish
Assistant Examiner—Rosemary Ashton
Attorney, Agent, or Firm—Fitzpatrick, Cella, Harper & Scinto

[57] ABSTRACT

An electrophotographic photosensitive member has a conductive support and a photosensitive layer provided on the conductive support. The photosensitive layer contains an oxytitanium phthalocyanine having intense peaks at 9.0°, 14.2°, 23.9° and 27.1° in the Bragg angle ($2\theta \pm 0.2°$) of CuK$\alpha$ characteristics X-ray diffraction or an oxytitanium phthalocyanine having intense peaks at 7.4°, 9.2°, 10.4°, 11.6°, 13.0°, 14.3°, 15.0°, 15.5°, 23.4°, 24.1°, 26.2° and 27.2° in the Bragg angle ($2\theta \pm 0.2°$) of CuK$\alpha$ characteristics X-ray diffraction, and further contains a non-metallic phthalocyanine.

10 Claims, 5 Drawing Sheets

ELECTROPHOTOGRAPHIC PHOTOSENSITIVE MEMBER

This application is a continuation, of application Ser. No. 07/625,803 filed Dec. 11, 1990, now abandoned.

BACKGROUND OF THE INVENTION

1. Field of the Invention

The present invention relates to an electrophotographic photosensitive member, and more particularly to an electrophotographic photosensitive member containing in its photosensitive layer a specific oxytitanium phthalocyanine and a non-metallic phthalocyanine.

2. Related Background Art

In recent years, as printers for terminal equipment, non-impact type printers that apply electrophotography have replaced conventional impact type printers and have been coming into wide use. These are mainly laser beam printers using laser beams as a light source. In many instances, semiconductor lasers are used as the light source from the viewpoint of cost and apparatus size.

At present, semiconductor lasers mainly used have an oscillation wavelength which is relatively as long as 790±20 nm. Accordingly, electrophotographic photosensitive members having sufficient sensitivities to such a long wavelength are being developed.

The sensitivities vary depending mainly on the types of charge-generating materials, and studies are being made on a number of charge-generating materials.

Typical charge-generating materials include phthalocyanine pigments, azo pigments, cyanine dyes, azulene dyes and squarium dyes.

Of these, as charge-generating materials having good sensitivities to long-wavelength light, researchers are recently made on metallic phthalocyanines such as aluminum chlorophthalocyanine, chloroindium phthalocyanine, oxyvanadium phthalocyanine, chlorogallium phthalocyanine, magnesium phthalocyanine and oxytitanium phthalocyanine, or non-metallic phthalocyanines.

For many phthalocyanine compounds among these, a number of crystal forms are known to exist. For example, the non-metallic phthalocyanines include an $\alpha$-type, a $\beta$-type, a $\gamma$-type, a $\delta$-type, an $\epsilon$-type, a $\chi$-type, and a $\tau$-type. Copper phthalocyanines include an $\alpha$-type, a $\beta$-type, a $\gamma$-type, a $\delta$-type, an $\eta$-type and a $\chi$-type.

It is also commonly known that the crystal form has a great influence on both (1) the electrophotographic performance such as sensitivity and potential stability at the time of running and (2) the properties of coating compositions in the event the compounds are formed into coating compositions.

With regard to oxytitanium phthalocyanine also, there are many crystal forms like other phthalocyanines such as the non-metallic phthalocyanines and copper phthalocyanine as described above. For example, Japanese Patent Applications Laid-open No. 59-49544 (U.S. Pat. No. 4,444,861), No. 59-166959, No. 61-239248 (U.S. Pat. No. 4,728,592), No. 62-67094, (U.S. Pat. No. 4,664,997), No. 63-366, No. 63-116158, No. 63-198067, No. 64-17066, etc. disclose oxytitanium phthalocyanines with different crystal forms.

The oxytitanium phthalocyanines are materials having superior electrophotographic performance, but it is sought to further improve dispersion stability, sensitivity and image quality.

SUMMARY OF THE INVENTION

An object of the present invention is to provide an electrophotographic photosensitive member that has good dispersion stability of a coating composition for forming a photosensitive layer, has a high sensitivity and can give a high-quality image.

According to the present invention, there is provided an electrophotographic photosensitive member comprising a conductive support and a photosensitive layer provided on the conductive support, wherein said photosensitive layer contains an I-type oxytitanium phthalocyanine having most intense four peaks at 9.0°, 14.2°, 23.9° and 27.1° in the Bragg angle ($2\theta \pm 0.2°$) of CuK$\alpha$ characteristics X-ray diffraction or N-type oxytitanium phthalocyanine having intense peaks at 7.4°, 9.2°, 10.4°, 11.6°, 13.0°, 14.3°, 15.0°, 15.5°, 23.4°, 24.1°, 26.2° and 27.2° in the Bragg angle ($2\theta \pm 0.2°$) of CuK$\alpha$ characteristics X-ray diffraction, wherein the most intense four peaks are at 9.2°, 15.0°, 26.2° and 27.2° in the Bragg angle; and further contains a non-metallic phthalocyanine.

DESCRIPTION OF THE PREFERRED EMBODIMENTS

Figure 1:
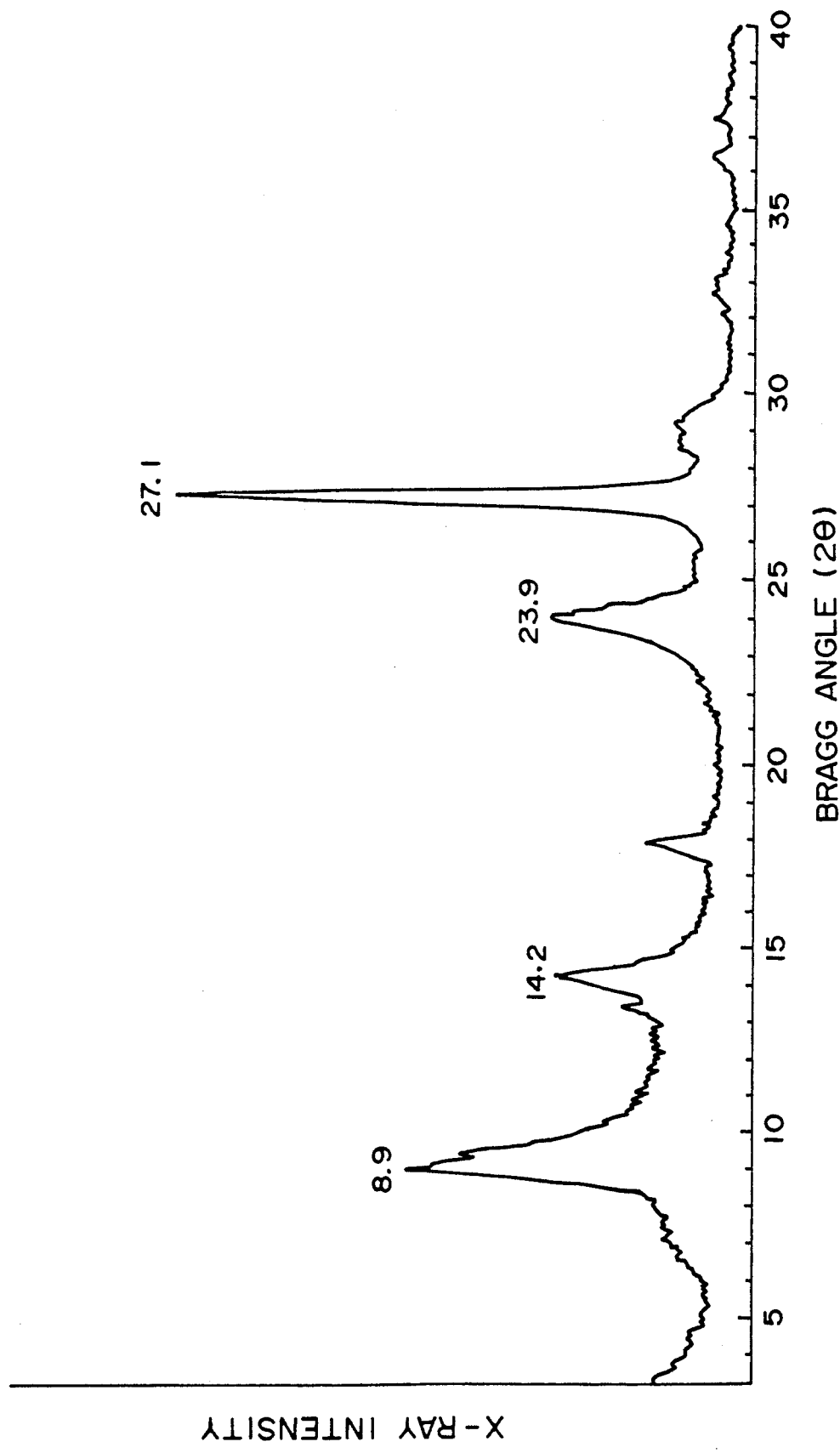
FIGS. 1 and 2 show CuK$\alpha$ characteristics X-ray diffraction patterns of oxytitanium phthalocyanines obtained in Synthesis Examples 1 and 2, respectively.

The oxytitanium phthalocyanine used in the present invention is represented by the following structural formula:

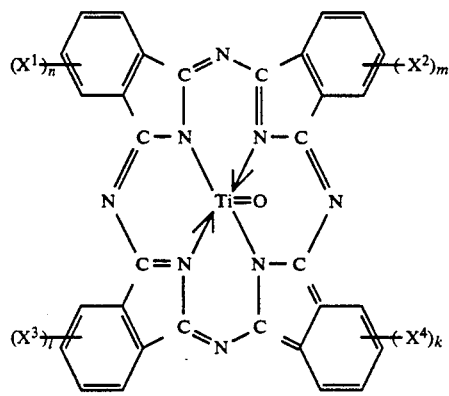

wherein $X^1$, $X^2$, $X^3$ and $X^4$ each represent Cl or Br, and n, m, l and k are each an integer of 0 to 4.

As previously mentioned, there are various crystal forms of the oxytitanium phthalocyanine. As a result of intensive studies, the present inventors have discovered that the dispersion stability of a photosensitive layer coating composition can be improved when the photosensitive layer coating composition contains an oxytitanium phthalocyanine with a specific crystal form and a non-metallic phthalocyanine.

With that improvement, it was also found possible to provide an electrophotographic photosensitive member having a high sensitivity and capable of giving a good image.

There are no particular limitations on the non-metallic phthalocyanine used in the present invention. It may preferably be added in an amount of from 0.1 to 30% by weight, particularly preferably from 1.0 to 10% by weight, based on the oxytitanium phthalocyanine.

Synthesis examples of oxytitanium phthalocyanine crystals used in the present invention will be described below.

In the following, "part(s)" indicates "parts(s) by weight".

SYNTHESIS EXAMPLE 1

In 100 g of α-chloronaphthalene, 5.0 g of o-phthalodinitrile and 2.0 g of titanium tetrachloride were stirred for 3 hours under heating at 200° C. Thereafter the reaction mixture was cooled to 50° C. and the crystals precipitated were filtered to give a paste of dichlorotitanium phthalocyanine. Next, this product was washed with 100 ml of N,N'-dimethylformamide heated to 100° C., with stirring, and subsequently the washing was repeated twice using 100 ml of methanol kept at 60° C., followed by filtration. The resulting paste was stirred at 80° C. for 1 hour in 100 ml of deionized water, followed by filtration to give blue oxytitanium phthalocyanine crystals. Yield: 4.3 g.

This compound was subjected to elemental analysis to obtain the following values.

| Values of elementary analysis: ($C_{32}H_{16}N_8OTi$) | | | | |
| --- | --- | --- | --- | --- |
| | C | H | N | Cl |
| Calculated (%) | 66.68 | 2.80 | 19.44 | 0.00 |
| Found (%) | 66.50 | 2.99 | 19.42 | 0.47 |

Next, the resulting crystals were dissolved in 150 g of conc. sulfuric acid, and the solution was dropwise added to 1,500 ml of deionized water of 20° C. with stirring to carry out reprecipitation, followed by filtration and thorough washing with water to give an amorphous oxytitanium phthalocyanine. In 100 ml of methanol, 4.0 g of the amorphous oxytitanium phthalocyanine thus obtained was treated by suspension and stirring at room temperature (22° C.) for 8 hours, followed by filtration and drying under reduced pressure to give a low-crystalline oxytitanium phthalocyanine. Next, 40 ml of n-butyl ether was added to 2.0 g of the resulting oxytitanium phthalocyanine, and these were subjected to milling at room temperature (22° C.) for 20 hours using glass beads of 1 mm in diameter.

Solid contents taken from the resulting dispersion were thoroughly washed with methanol and then with water, followed by drying to give novel oxytitanium phthalocyanine crystals of the present invention. Yield: 1.8 g. An X-ray diffraction pattern of this oxytitanium phthalocyanine is shown in FIG. 1. As will be seen from, FIG. 1, this oxytitanium phthalocyanine has the most intense four peaks at 9.0°, 14.2°, 23.9° and 27.1° in the Bragg angle (2θ±0.2°).

SYNTHESIS EXAMPLE 2

A blue oxytitanium phthalocyanine was obtained in the same manner as in Synthesis Example 1.

Figure 2:
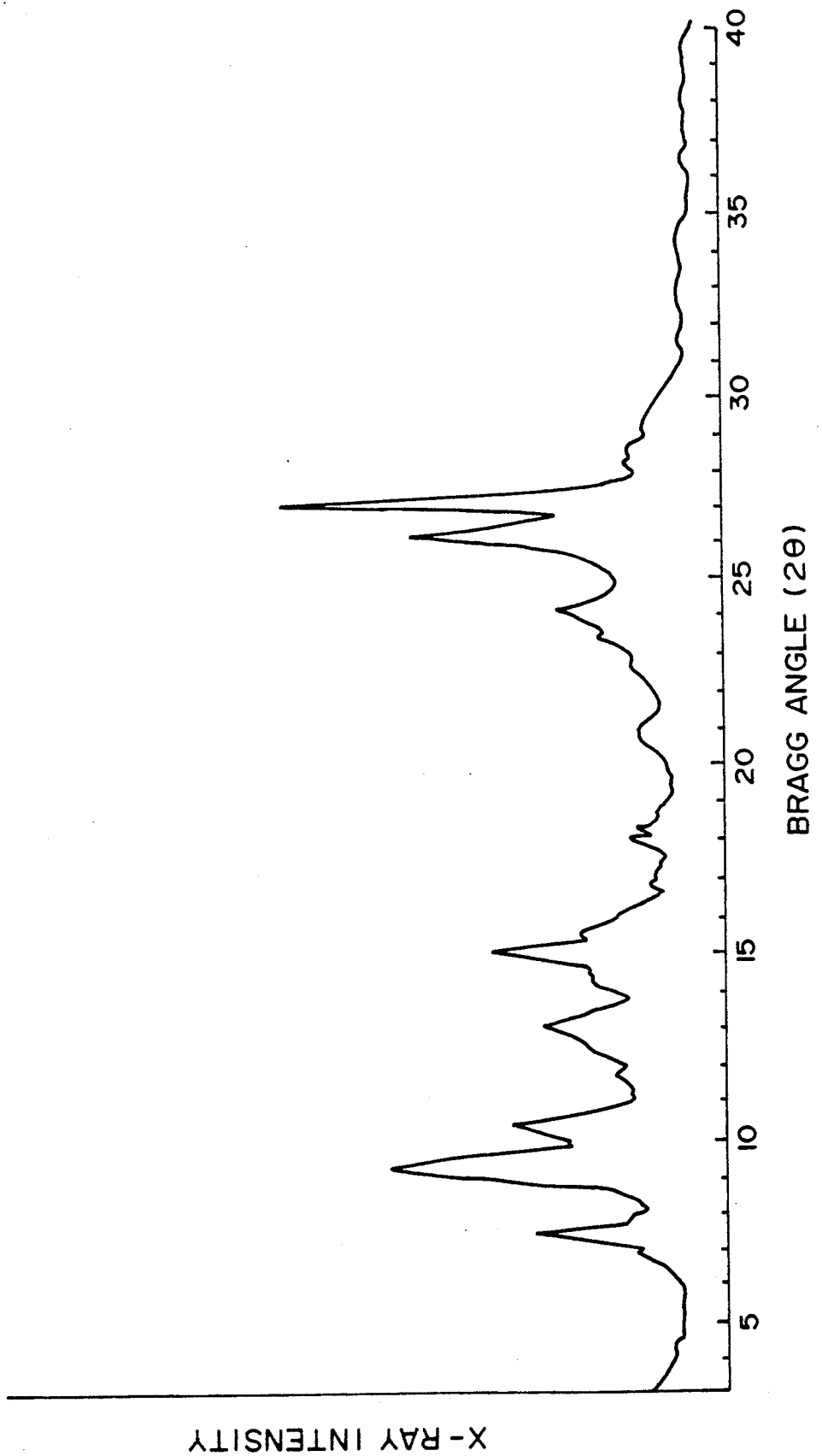

Next, the resulting crystals were dissolved in 30 parts of conc. sulfuric acid, and the solution was dropwise added to 300 parts of deionized water of 20° with stirring to carry out reprecipitation, followed by filtration to give an amorphous oxytitanium phthalocyanine. Into 10 parts of the amorphous oxytitanium phthalocyanine thus obtained, 15 parts of sodium chloride and 7 parts of diethylene glycol were mixed, and the mixture was subjected to milling for 60 hours using an automatic mortar under heating at 80° C. Next, the mixture thus treated was thoroughly washed with water in order to completely remove the sodium chloride and diethylene glycol contained in it. The product was dried under reduced pressure. Thereafter, 200 parts of cyclohexanone was added thereto together with glass beads of 1 mm in diameter, and treatment was carried out for 30 minutes using a sand mill to give oxytitanium phthalocyanine crystals of the present invention. An X-ray diffraction pattern of the oxytitanium phthalocyanine crystals is shown in FIG. 2. As will be seen from FIG. 2, this oxytitanium phthalocyanine has intense peaks at 7.4°, 9.2°, 10.4°, 11.6°, 13.0°, 14.3°, 15.0°, 15.5°, 23.4°, 24.1°, 26.2° and 27.2° in the Bragg angle (2θ±0.2°) and the most intense four peaks at 9.2°, 15.0°, 26.2° and 27.2°.

The X-ray diffraction patterns in the present invention are obtained by the measurement carried out using CuKα radiation under the following conditions. Measuring apparatus used: An X-ray diffraction apparatus manufactured by Rigaku Denki K.K.

X-ray bulb: Cu
Voltage: 50 kV
Electric current: 40 mA
Scanning method: 2θ/θ scan
Sampling interval: 0.020 deg.
Start angle (2θ): 3 deg.
Stop angle (2θ): 40 deg.
Divergence slit: 0.5 deg.
Scattering slit: 0.5 deg.
Receiving slit: 0.3 mm
Curved monocromator was used.

Typical layer constitution of the electrophotographic photosensitive member will be described below with reference to FIGS. 3 and 4.

Figure 3:
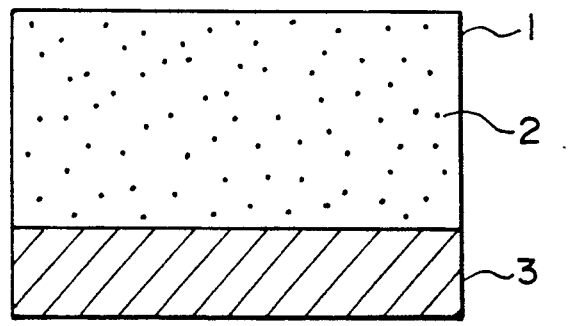
FIGS. 3 and 4 illustrate examples of the layer constitution of the electrophotographic photosensitive member according to the present invention.

In the embodiment shown in FIG. 3, a photosensitive layer 1 is comprised of a single layer. The photosensitive layer 1 contains a charge-generating material 2 and a charge-transporting material (not shown in the drawing) in the same layer.

The numeral 3 denotes a conductive support.

Figure 4:
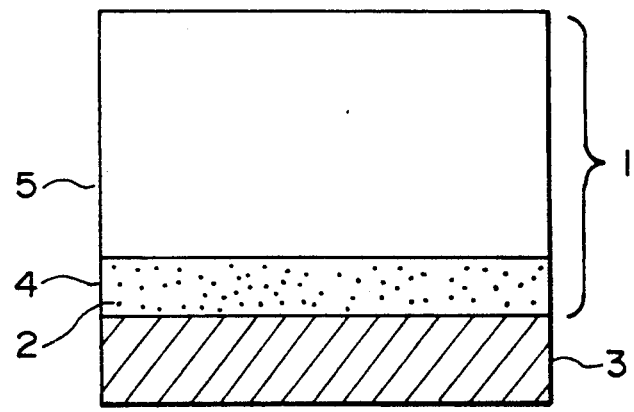

In the embodiment shown in FIG. 4, a photosensitive layer 1 has a laminated structure comprised of a charge generation layer 4 and a charge transport layer 5. The charge transport layer 4 contains a charge-generating material 2.

The lamination of the charge generation layer 4 and charge transport layer 5 shown in FIG. 4 may be in an up-and-down reverse relation.

When the electrophotographic photosensitive member of the present invention is prepared, the conductive support 3 may be made of any materials so long as they have conductivity, including metals such as aluminum, aluminum alloys and stainless steel, a conductive plastic or paper provided with a conductive layer. The conductive support may have the form of a cylinder or a film.

A subbing layer having both barrier function and adhesive function may also be provided between the conductive support 3 and the photosensitive layer 1.

As materials for the subbing layer, polyvinyl alcohol, polyethylene oxide, ethyl cellulose, methyl cellulose, casein, polyamide, glue and gelatin may be used.

Usually, any of these are dissolved in a suitable solvent and the resulting solution is coated on the conductive support. The coating thickness may be in the range of from 0.2 to 3.0 μm.

The oxytitanium phthalocyanine of the present invention is used as the charge-generating material.

When the photosensitive layer 1 comprised of the single layer as shown in FIG. 3 is formed, the oxytitanium phthalocyanine charge-generating material 2 of the present invention and the charge-transporting material (not shown in the drawing) may be mixed in a suitable liquid material, e.g., a solution, of the binder resin described later, and the resulting coating solution may be applied followed by drying.

As a method of forming the charge generation layer 4 that constitutes the photosensitive layer 1 having the laminated structure of the charge generation layer 4 and the charge transport layer 5 as shown in FIG. 4, the oxytitanium phthalocyanine charge-generating material of the present invention may be dispersed together with a suitable binder resin solution, and the resulting dispersion may be applied to the surface of the conductive support 3 followed by drying. In this instance, the binder may not be used.

The binder resin used herein includes, for example, polyester resins, acrylic resins, polyvinyl carbazole resins, phenoxy resins, polycarbonate resins, polyvinylbutyral resins, polystyrene resins, polyvinyl acetate resins, polysulfone resins, polyarylate resins, and vinylidene chloride-acrylonitrile copolymer resins, which are mainly used.

To form the charge transport layer, a coating composition prepared by dissolving a charge-transporting material and a binder resin in a solvent may be applied, followed by drying.

The charge-transporting material used may include all sorts of triarylamine compounds, hydrazone compounds, stilbene compounds, pyrazoline compounds, oxazole compounds, thiazole compounds and triarylmethane compounds.

As the binder resin, those described above can be used.

These photosensitive layers can be formed by coating methods such as dipping, spray coating, spin coating, bead coating, blade coating and beam coating.

In the case the photosensitive layer is comprised of the single layer, it may preferably have a film thickness of from 5 to 40 μm, and particularly preferably from 10 to 30 μm.

In the case the photosensitive layer has the laminated structure, the charge generation layer may preferably have a film thickness of from 0.01 to 10 μm, and particularly preferably from 0.05 to 5 μm. The charge transport layer may preferably have a film thickness of from 5 to 40 μm, and particularly preferably from 10 to 30 μm.

In order to protect these photosensitive layers from externally applied mechanical and chemical adverse influences, a resin layer or a resin layer in which conductive particles have been dispersed may be provided as a thin protective layer on the surface of the photosensitive layer.

The electrophotographic photosensitive member of the present invention can be utilized not only in printers such as a laser beam printer, an LED printer and a CRT printer, but can be also widely used in conventional electrophotographic copying machines and in the field in which the electrophotography is applied.

Figure 6:
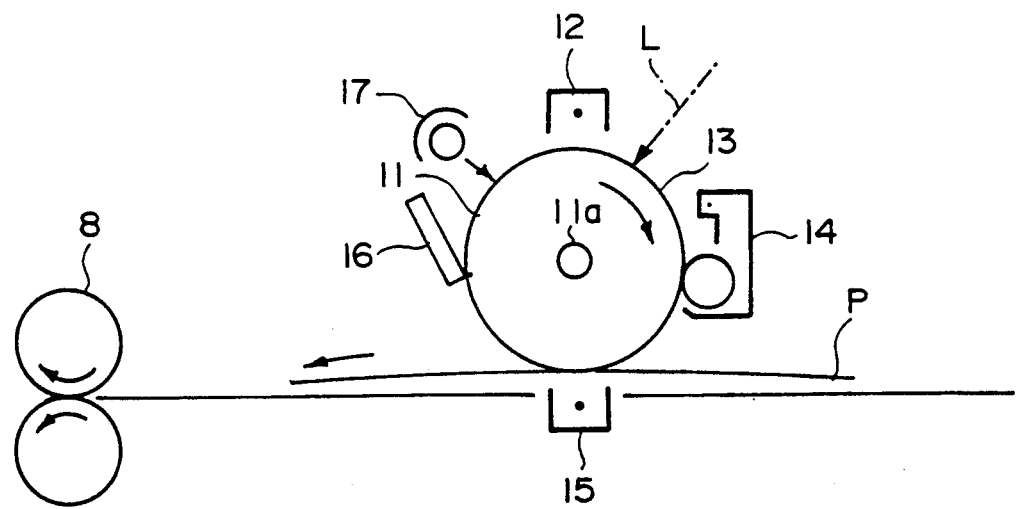
FIG. 6 schematically illustrates an example of the constitution of an electrophotographic apparatus in which the electrophotographic photosensitive member of the present invention is used.

FIG. 6 schematically illustrates an example of the constitution of a commonly available transfer type electrophotographic apparatus in which the electrophotographic photosensitive member of the present invention is used.

In FIG. 6, the numeral 11 denotes a drum photosensitive member serving as an image carrying member, which is rotated around a shaft 11a at a given peripheral speed in the direction shown by an arrow. In the course of rotation, the photosensitive member 11 is uniformly charged on its periphery, with positive or negative uniform potential by the operation of a charging means 12, and then imagewise exposed to light L (slit exposure, laser beam scanning exposure, etc.) at an exposure area 13 by the operation of an imagewise exposure means (not shown). As a result, electrostatic latent images corresponding to the exposure images are successively formed on the periphery of the photosensitive member.

The electrostatic latent images thus formed are subsequently developed by toner by the operation of a developing means 14. The resulting toner-developed images are then successively transferred by the operation of a transfer means 15, to the surface of a transfer medium P fed from a paper feed section (not shown) to the part between the photosensitive member 11 and the transfer means 15 in the manner synchronized with the rotation of the photosensitive member 11.

The transfer medium P on which the images have been transferred is separated from the surface of the photosensitive member and led through an image-fixing means 18, where the images are fixed and then delivered to the outside as a transcript (a copy).

The surface of the photosensitive member 11 after the transfer of images is cleaned of the toner remaining after the transfer, using a cleaning means 16. Thus the photosensitive member is cleaned on its surface. Further, the charges remaining thereon is removed by the operation of a preexposure means 17. The photosensitive member is then repeatedly used for the formation of images.

The charging means 12 for giving uniform charge on the photosensitive member 11 include corona chargers, which are commonly put into wide use. As the transfer means 15, a corona transfer unit is also commonly put into wide use.

The electrophotographic apparatus may be constituted of a combination of plural components joined as one device unit from among the constituents such as the above photosensitive member, developing means and cleaning means so that the unit can be freely mounted on or detached from the body of the apparatus. For example, at least one of the charging means, the developing means and the cleaning means may be formed into one unit together with the photosensitive member so that the unit can be freely mounted or detached using a guide means such as a rail provided in the body of the apparatus. Here, the above device unit may be so constituted as to be joined together with the charge means and/or the developing means.

In the case when the electrophotographic apparatus is used as a copying machine or a printer, optical image exposing L may be carried out by using a light reflected from, or transmitted through, an original; or the original may be read by a sensor to convert to a signal, according to which signal the scanning of a laser beam, driving of an LED array, or driving of a liquid crystal shutter array may be performed to carry out the exposing.

Figure 7:
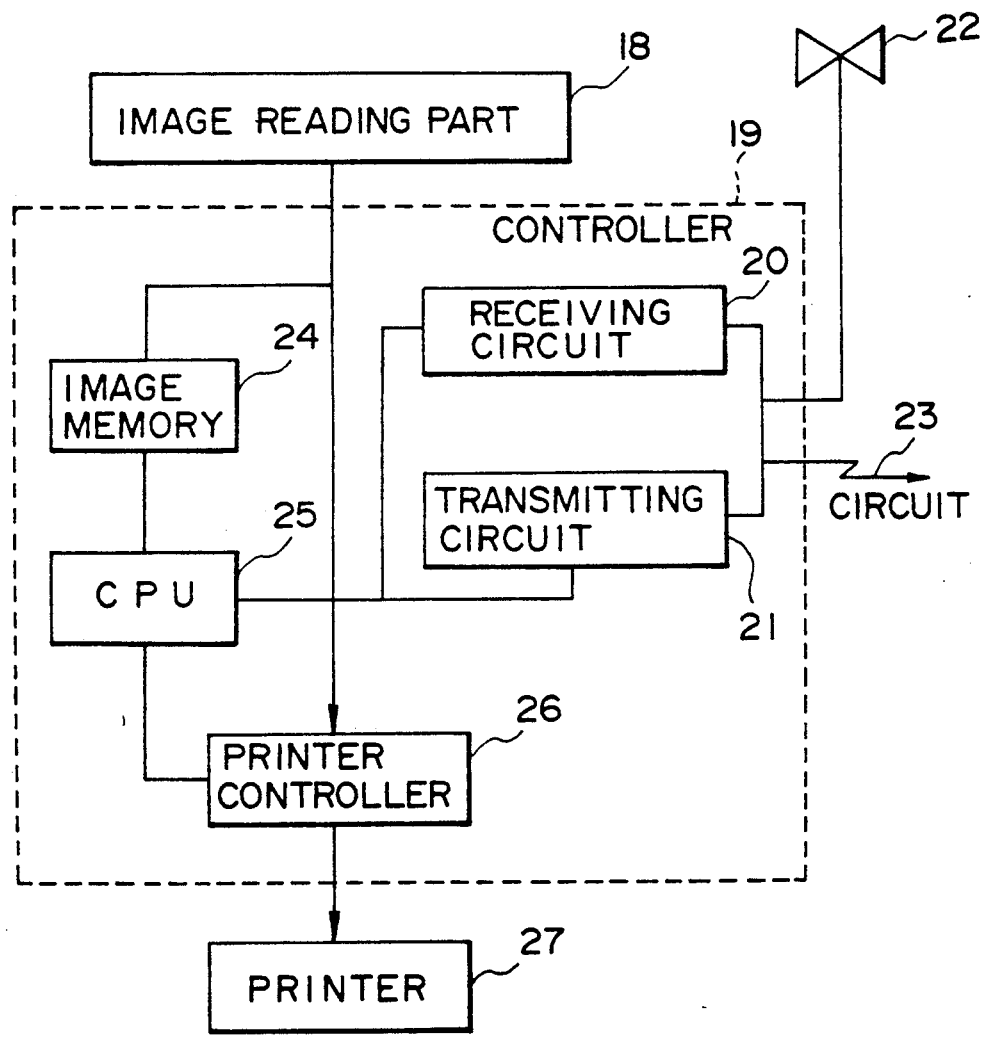
FIG. 7 is a block diagram of a facsimile machine in which the electrophotographic apparatus comprised of the electrophotographic photosensitive member of the present invention is used as a printer.

When used as a printer of a facsimile machine, the optical image exposing light L serves as exposing light used for the printing of received data. FIG. 7 illustrates an example thereof in the form of a block diagram.

A controller 19 controls an image reading part 18 and a printer 27. The whole of the controller 19 is controlled by CPU 25. Image data outputted from the image reading part is sent to the other facsimile station through a transmitting circuit 21. Data received from the other station is sent to a printer 27 through a receiving circuit 20. Given image data are stored in an image memory 24. A printer controller 26 controls the printer 27. The numeral 22 denotes a telephone.

An image received from a circuit 23 (image information from a remote terminal connected through the circuit) is demodulated in the receiving circuit 20, and then successively stored in the image memory 24 after the image information is decoded by the CPU 25. Then, when images for at least one page have been stored in the memory 24, the image recording for that page is carried out. The CPU 25 reads out the image information for one page from the memory 24 and sends the decoded image information for one page to the printer controller 26. The printer controller 26, having received the image information for one page from the CPU 25, controls the printer 27 so that the image information for one page is recorded.

The CPU 25 receives image information for next page in the course of the recording by the printer 27.

Images are received and recorded in the above way.

The present invention will be described below in greater detail by giving Examples.

EXAMPLE 1

With a sand mill using glass beads of 1 mm in diameter, 50 parts of titanium oxide powder whose particles were coated with tin oxide containing 10% of antimony oxide, 25 parts of a resol type phenol resin, 20 parts of methyl cellosolve, 5 parts of methanol and 0.002 part of a silicone oil (a polydimethylsiloxane-polyoxyalkylene copolymer; average molecular weight: 3,000) were dispersed for 2 hours to prepare a conductive layer coating composition.

The above coating composition was applied to an aluminum cylinder (30 mm in outer diameter×260 mm in length) and then dried at 140° C. for 30 minutes to form a conductive layer of 20 μm in film thickness.

On this conductive layer, a solution obtained by dissolving 5 parts of a 6-66-610-12 quaternary copolymer polyamide resin in a mixed solvent of 70 parts of methanol and 25 parts of butanol was coated by dipping, followed by drying to provide a subbing layer of 1 μm in film thickness.

Next, 4 parts of the oxytitanium phthalocyanine crystals obtained in Synthesis Example 1 according to the present invention, 1.0% by weight of metal-free phthalocyanine based on said oxytitanium phthalocyanine, and 2 parts of a polyvinylbutyral resin were added to 100 parts of cyclohexanone, and these were dispersed for 2 hours using a sand mill using glass beads of 1 mm in diameter. Thereafter, the resulting dispersion was diluted by adding 100 parts of methyl ethyl ketone, and the dilute solution was collected to give a coating solution. This solution was coated on the subbing layer, followed by drying at 80° C. for 10 minutes to form a charge generation layer of 0.15 μm in film thickness.

Next, a solution prepared by dissolving 10 parts of the compound represented by the following structural formula:

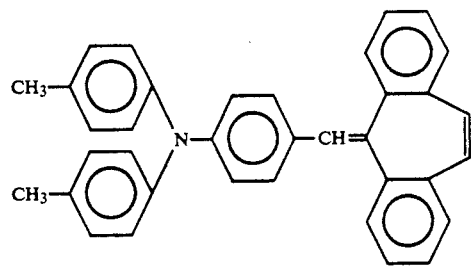

and 10 parts of a bisphenol Z polycarbonate resin in 60 parts of monochlorobenzene was coated on the charge generation layer by dipping. The coating was dried at a temperature of 110° C. for 1 hour to form a charge transport layer of 20 μm in film thickness.

The resulting photosensitive member was fitted to a laser beam printer (trade name: LBP-SX; manufactured by Canon Inc.), and a charging unit was so set as to give a dark potential of −700 (V). This photosensitive member was irradiated with a laser beam of 802 nm in wavelength and the amount of light necessary for the potential of −700 (V) to be turned to −150 (V) was measured. The measured values were used as the measure of sensitivity.

Next, under the potential set as above, the image-forming performance of the photosensitive member was evaluated with attention to the "fogging" at white solid areas.

The stability of the dispersion for forming the charge generation layer was also evaluated under the following three conditions.

(1) Left to stand in a hermetically stoppered state.
(2) Stirred in an open state. (The solvent loss by evaporation was appropriately replenished.)
(3) Placed under continuous operation using a circulating coating apparatus (FIG. 5) comprised of a stirring chamber, a circulation pump and a filter.

The evaluation was made on the basis of the occurrence of agglomeration, by examining whether or not a filter paper clogs at the time of filtration (whether or not a pressure gauge indicates a rise of pressure) and whether or not any granular deposits are seen on a coating which was formed on an aluminum sheet dipped in the dispersion and withdrawn followed by drying.

Results obtained are shown in Table 1.

Figure 5:
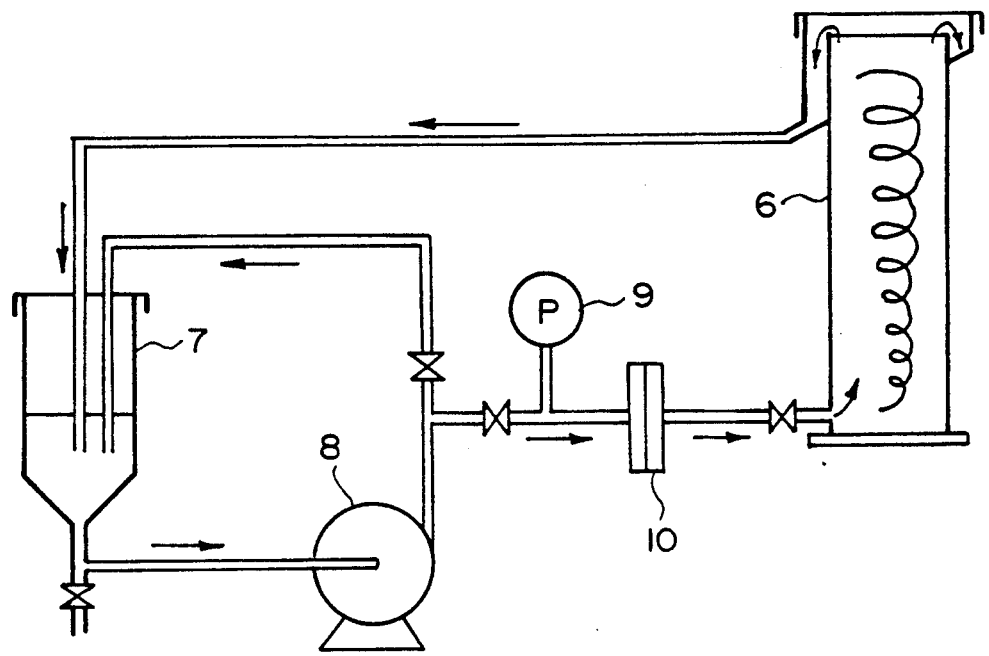
FIG. 5 illustrates a circulating coating apparatus used in Examples and Comparative Examples.

In FIG. 5, the numeral 6 denotes a coating chamber; 7, a liquid reservoir; 8, a pump; 9, a pressure gauge; and 10, a filter.

EXAMPLE 2

An electrophotographic photosensitive member was prepared and evaluated in the same manner as in Example 1 except that the non-metallic phthalocyanine was contained in an amount of 0.1% by weight.

Results obtained are shown in Table 1.

EXAMPLE 3

An electrophotographic photosensitive member was prepared and evaluated in the same manner as in Example 1 except that the non-metallic phthalocyanine was in an amount of 10.0% by weight. Results obtained are shown in Table 1.

EXAMPLE 4

An electrophotographic photosensitive member was prepared and evaluated in the same manner as in Example 1 except that the non-metallic phthalocyanine was in an amount of 30.0% by weight. Results obtained are shown in Table 1.

EXAMPLES 5, 6, 7 and 8

Electrophotographic photosensitive members were prepared and evaluated in the same manner as in Examples 1, 2, 3 and 4, respectively, except that the oxytitanium phthalocyanine used therein was replaced with the oxytitanium phthalocyanine obtained in Synthesis Example 2. Results obtained are shown in Table 1.

EXAMPLE 9

An electrophotographic photosensitive member was prepared and evaluated in the same manner as in Example 5 except that the non-metallic phthalocyanine was in an amount of 40.0% by weight. Results obtained are shown in Table 1.

COMPARATIVE EXAMPLE 1

An electrophotographic photosensitive member was prepared and evaluated in the same manner as in Example 5 except that no non-metallic phthalocyanine was used. Results obtained are shown in Table 1.

COMPARATIVE EXAMPLE 2

An electrophotographic photosensitive member was prepared and evaluated in the same manner as in Example 5 except that the oxytitanium phthalocyanine used therein was replaced with an A-type oxytitanium phthalocyanine synthesized by the method described in Japanese Patent Application Laid-open No. 62-67094 (U.S. Pat. No. 4,664,997). Results obtained are shown in Table 1.

COMPARATIVE EXAMPLE 3

An electrophotograohic photosensitive member was prepared and evaluated in the same manner as in Example 5 except that the oxytitanium phthalocyanine used therein was replaced with an α-type oxytitanium phthalocyanine synthesized by the method described in Japanese Patent Application Laid-open No. 61-239248 (U.S. Pat. No. 4,728,592). Results obtained are shown in Table 1.

TABLE 1

| Non-metal phthalocyanine content (%) | Sensitivity ($\mu J/cm^2$) | Fog | Dispersion stability (period of time until agglomeration occurs) (1)* | (2)* | (3)* |
|---|---|---|---|---|---|
| Example: | | | | | |
| 1  1.0  | 0.23 | AA | >1 year** | 6 m. | 5 m. |
| 2  0.1  | 0.24 | A  | "         | 5 m. | 4 m. |
| 3  10.0 | 0.25 | AA | "         | 6 m. | 5 m. |
| 4  30.0 | 0.28 | A  | "         | "    | "    |
| 5  1.0  | 0.30 | AA | "         | 6 m. | 4 m. |
| 6  0.1  | 0.27 | A  | "         | 5 m. | 3 m. |
| 7  10.0 | 0.30 | AA | "         | 6 m. | 4 m. |
| 8  30.0 | 0.35 | A  | "         | "    | "    |
| 9  40.0 | 0.71 | B  | "         | "    | "    |
| Comparative Example: | | | | | |
| 1  —   | 0.27 | C | 6 m.  | 1.5 m. | 4 days |
| 2  1.0 | 0.90 | B | 10 m. | 3 m.   | 2 m.   |
| 3  1.0 | 0.75 | B | 11 m. | 3.5 m. | 3 m.   |

*The condition noted in Example 1; m.: months
**No change for more than 1 year
AA: No fog was seen at all.
A: Fog was little seen.
B: Fog was slightly seen.
C: Fog was seen all over.

I claim:

1. An electrophotographic photosensitive member comprising a conductive support and a photosensitive layer provided on the conductive support, wherein said photosensitive layer contains an I-type oxytitanium phthalocyanine having most intense four peaks at 9.0°, 14.2°, 23.9° and 27.1° in the Bragg angle (2θ±0.2°) of CuKα characteristics X-ray diffraction or an N-type oxytitanium phthalocyanine having intense peaks at 7.4°, 9.2°, 10.4°, 11.6°, 13.0°, 14.3°, 15.0°, 15.5°, 23.4°, 24.1°, 26.2° and 27.2° in the Bragg angle (2θ±0.2) of CuKα characteristics X-ray diffraction, wherein the most intense four peaks are at 9.2°, 15.0°, 26.2° and 27.2° in the Bragg angle and further contains a non-metallic phthalocyanine.

2. An electrophotographic photosensitive member according to claim 1, wherein said non-metallic phthalocyanine is contained in an amount of from 0.1 to 30% by weight based on said oxytitanium phthalocyanine.

3. An electrophotographic photosensitive member according to claim 1, wherein said photosensitive layer has a charge generation layer and a charge transport layer.

4. An electrophotographic photosensitive member according to claim 3, wherein said charge transport layer is laminated on said charge generation layer.

5. An electrophotographic photosensitive member according to claim 3, wherein said charge generation layer is laminated on said charge transport layer.

6. An electrophotographic photosensitive member according to claim 1, wherein said photosensitive layer comprises a single layer.

7. An electrophotographic photosensitive member according to claim 1, wherein a subbing layer is provided between said conductive support and said photosensitive layer.

8. An electrophotographic photosensitive member according to claim 1, wherein a protective layer is provided on said photosensitive layer.

9. An electrophotographic apparatus, comprising an electrophotographic photosensitive member, a means for forming an electrostatic latent image, a developing means for developing the electrostatic latent image formed, and a transfer means for transferring the developed image, said electrophotographic photosensitive member comprising a conductive support and a photosensitive layer provided on the conductive support, wherein said photosensitive layer contains an I-type oxytitanium phthalocyanine having most intense four peaks at 9.0°, 14.2°, 23.9° and 27.1° in the Bragg angle (2θ±0.2°) of CuKα characteristics X-ray diffraction or an N-type oxytitanium phthalocyanine having intense peaks at 7.4°, 9.2°, 10.4°, 11.6°, 13.0°, 14.3°, 15.0°, 15.5°, 23.4°, 24.1°, 26.2° and 27.2° in the Bragg angle (2θ±0.2°) of CuKα characteristics X-ray diffraction, wherein the most intense four peaks are at 9.2°, 15.0°, 26.2° and 27.2° in the Bragg angle, and further contains a non-metallic phthalocyanine.

10. An electrophotographic apparatus according to claim 9, wherein said non-metallic phthalocyanine is contained in an amount of from 0.1 to 30% by weight based on said oxytitanium phthalocyanine.

* * * * *

UNITED STATES PATENT AND TRADEMARK OFFICE
CERTIFICATE OF CORRECTION

PATENT NO. : 5,298,353
DATED : March 29, 1994
INVENTOR(S) : Hiroyuki Ohmori

It is certified that error appears in the above-indentified patent and that said Letters Patent is hereby corrected as shown below:

COLUMN 1

Line 36, "researchers are" should be deleted.
Line 37, "recently made" should read --research was recently conducted--.

Signed and Sealed this

Eighth Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,298,353
DATED : March 29, 1994
INVENTOR(S) : HIROYUKI OHMORI

It is certified that error appears in the above-identified patent and that said Letters Patent is hereby corrected as shown below:

COLUMN 1

Line 36, "researchers are" should be deleted.
    Line 37, "recently made" should read --research was recently conducted--.

COLUMN 2

Line 12, "an I-type" should read --a first--.
    Line 15, "N-type" should read --a second--.

COLUMN 10

Line 18, "an I-type" should read --a first--.
    Line 20, "an N-type" should read --a second--
    Line 55, "an I-type" should read --a first--.
    Line 58, "an N-type" should read --a second--

This certificate supersedes Ceretificate of Correction issued November 8, 1994.

Signed and Sealed this

Twenty-eight Day of March, 1995

Attest:

BRUCE LEHMAN

Attesting Officer      Commissioner of Patents and Trademarks